United States Patent
Chakrobartty et al.

(10) Patent No.: US 10,498,585 B2
(45) Date of Patent: Dec. 3, 2019

(54) SENSOR DATA ANALYTICS AND ALARM MANAGEMENT

(71) Applicant: Walmart Apollo, LLC, Bentonville, AR (US)

(72) Inventors: Shuvro Chakrobartty, Bentonville, AR (US); Britto Michaelsamy, Bentonville, AR (US); Kalaiselvan Muniyan, Bentonville, AR (US); David T. Sayers, Anderson, MO (US); Auer Don Duncan, Anderson, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 384 days.

(21) Appl. No.: 15/292,621

(22) Filed: Oct. 13, 2016

(65) Prior Publication Data
US 2017/0111210 A1    Apr. 20, 2017

Related U.S. Application Data

(60) Provisional application No. 62/242,882, filed on Oct. 16, 2015.

(51) Int. Cl.
*H04L 12/24* (2006.01)
*H04L 29/08* (2006.01)
*H04L 12/28* (2006.01)

(52) U.S. Cl.
CPC ...... *H04L 41/0631* (2013.01); *H04L 12/2827* (2013.01); *H04L 41/0681* (2013.01); *H04L 67/125* (2013.01); *H04L 67/2804* (2013.01); *H04L 67/2823* (2013.01); *H04L 67/025* (2013.01)

(58) Field of Classification Search
CPC ............ H04L 41/0631; H04L 12/2827; H04L 67/125; H04L 67/2823; H04L 41/0681; H04L 67/2804; H04L 67/025
See application file for complete search history.

(56) References Cited

U.S. PATENT DOCUMENTS

| | | |
|---|---|---|
| 5,365,514 A | 11/1994 | Hershey |
| 6,675,591 B2 | 1/2004 | Singh et al. |
| 6,981,385 B2 | 1/2006 | Arshansky et al. |
| 7,357,000 B2 | 4/2008 | Schwichtenberg et al. |
| 7,680,752 B1 | 3/2010 | Clune, III et al. |
| 7,721,259 B2 | 5/2010 | Heinke et al. |

(Continued)

OTHER PUBLICATIONS

Simion, et al. "Slingshot: A modular framework for designing data processing systems", Department of Computer Science, University of Toronto, 33 pages.

(Continued)

*Primary Examiner* — Michael A Keller
(74) *Attorney, Agent, or Firm* — Patterson Thuente Pedersen, P.A.

(57) ABSTRACT

Systems and methods for analyzing sensor data can be implemented to monitor and correct, malfunctioning, inoperative, and/or inefficient appliances across multiple locations. In embodiments, a system for analyzing sensor data includes a plurality of sensors, a sensor controller unit, a local server, an event preprocessor, an event stream processing engine, a complex event processing engine, an alert and analytic dashboard, a business rules engine, and a database.

16 Claims, 3 Drawing Sheets

(56) References Cited

U.S. PATENT DOCUMENTS

| | | | |
|---|---|---|---|
| 8,648,706 B2 | 2/2014 | Ranjun et al. | |
| 8,694,880 B2 | 4/2014 | Krasner et al. | |
| 8,725,298 B2 | 5/2014 | Wallaert | |
| 8,890,675 B2 | 11/2014 | Ranjan et al. | |
| 9,092,958 B2 | 7/2015 | Brueggen et al. | |
| 9,304,827 B2 | 4/2016 | Werth et al. | |
| 9,679,125 B2 | 6/2017 | Bailor | |
| 2002/0049608 A1 | 4/2002 | Hartsell et al. | |
| 2002/0134545 A1* | 9/2002 | Cho | A23B 7/10 165/289 |
| 2005/0083957 A1 | 4/2005 | Ilnicki et al. | |
| 2009/0055825 A1 | 2/2009 | Smith et al. | |
| 2009/0327331 A1 | 12/2009 | Mathew et al. | |
| 2011/0066752 A1 | 3/2011 | Lippincott et al. | |
| 2012/0124550 A1 | 5/2012 | Nocera et al. | |
| 2012/0330703 A1 | 12/2012 | Hohmann et al. | |
| 2014/0019977 A1 | 1/2014 | Kakade et al. | |
| 2015/0019714 A1* | 1/2015 | Shaashua | H04W 4/70 709/224 |
| 2015/0149298 A1* | 5/2015 | Tapley | G06Q 30/0633 705/14.66 |
| 2015/0205309 A1* | 7/2015 | Kriss | G05B 15/02 700/275 |
| 2015/0229557 A1 | 8/2015 | Kim et al. | |
| 2015/0310195 A1 | 10/2015 | Bailor et al. | |
| 2017/0111210 A1 | 4/2017 | Chakrobartty et al. | |
| 2017/0212959 A1 | 7/2017 | Li et al. | |
| 2017/0322806 A1 | 11/2017 | Malur | |
| 2018/0306381 A1* | 10/2018 | Fujisawa | F17C 5/06 |
| 2018/0306477 A1* | 10/2018 | Ji | F25D 29/00 |

OTHER PUBLICATIONS

Agrawal, Sumeet. "Top Three Reasons Why We Love Informatica Big Data Management", Dec. 22, 2015, retrieved from http://blogs.informatica.com/2015/12/22/topthreereasonsloveinformaticabigdatamanagement/#fbid=1zuQesmdDCo. Retrieved on Feb. 4, 2016, 12 pages.

International Search Report and Written Opinion, for PCT Application No. PCT/US2017/030804, dated Jul. 17, 2017, 15 pages.

International Search Report and Written Opinion, for PCT Application No. PCT/US2016/047336, dated Oct. 24, 2016, 11 pages.

Application and File History for U.S. Appl. No. 15/585,613, filed May 3, 2017, Inventors Malur.

International Preliminary Report on Patentability, Application No. PCT/US2016/056823, dated Apr. 17, 2018, 7 pages.

Controller Setup for Alarm Monitoring: Best Practices, Emerson, 2012.

Networked control monitoring & alarm system, Honeywell, 2002.

Cold Storage and Refrigeration, Pacific Controls.

* cited by examiner

SENSOR DATA ANALYTICS AND ALARM MANAGEMENT

CROSS-REFERENCE TO RELATED APPLICATIONS

This application claims the benefit of U.S. Provisional Patent Application 62/242,882, filed Oct. 16, 2015, and titled "Sensor Data Analytics and Alarm Management", the entire contents of which are hereby incorporated herein by reference

BACKGROUND

Currently there is a need to monitor the operating conditions of physical systems comprising multiple appliances such as refrigeration units and the like. In many settings, such appliances may be used to store products at optimized temperatures or other conditions, and spoilage may occur without strict adherence to the desired conditions. For example, food products are stored in refrigerators at retail locations. When a refrigerator malfunctions, the food products may spoil.

Current systems include sensors that detect the operating conditions, such as temperature in a refrigerator, and create an alarm if the conditions are outside an acceptable predetermined range. The alarm may be transmitted as a repair request in order to evaluate and/or treat the condition that caused the alarm. If the condition is not repaired in a timely manner, the result may be product spoilage.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for monitoring sensor data, collecting the sensor data, analyzing sensor data, and conducting real-time responses to specific conditions observed in the sensor data. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable and/or computer-readable program code embodied in the medium.

According to various embodiments of the present disclosure, systems and methods described herein are adapted to monitoring sensor data, collecting the sensor data, analyzing sensor data, and conducting real-time responses to specific conditions observed in the sensor data. As used in the present disclosure, "sensor data" may include data representing a physical condition observed and/or detected by a sensor. In embodiments, the data may be gathered from multiple distributed sensors. According to various embodiments, sensors are affiliated with one or more monitored appliances. Such appliances may include refrigerators, freezers, garbage compactors, lighting units, heating, ventilating, and air conditioning ("HVAC") systems, and the like. Such monitored appliances and sensors may be widely distributed amongst numerous locations such as retail stores in a retail chain. In other embodiments, such appliances and sensors are in various industrial, residential, or commercial settings.

Figure 1:
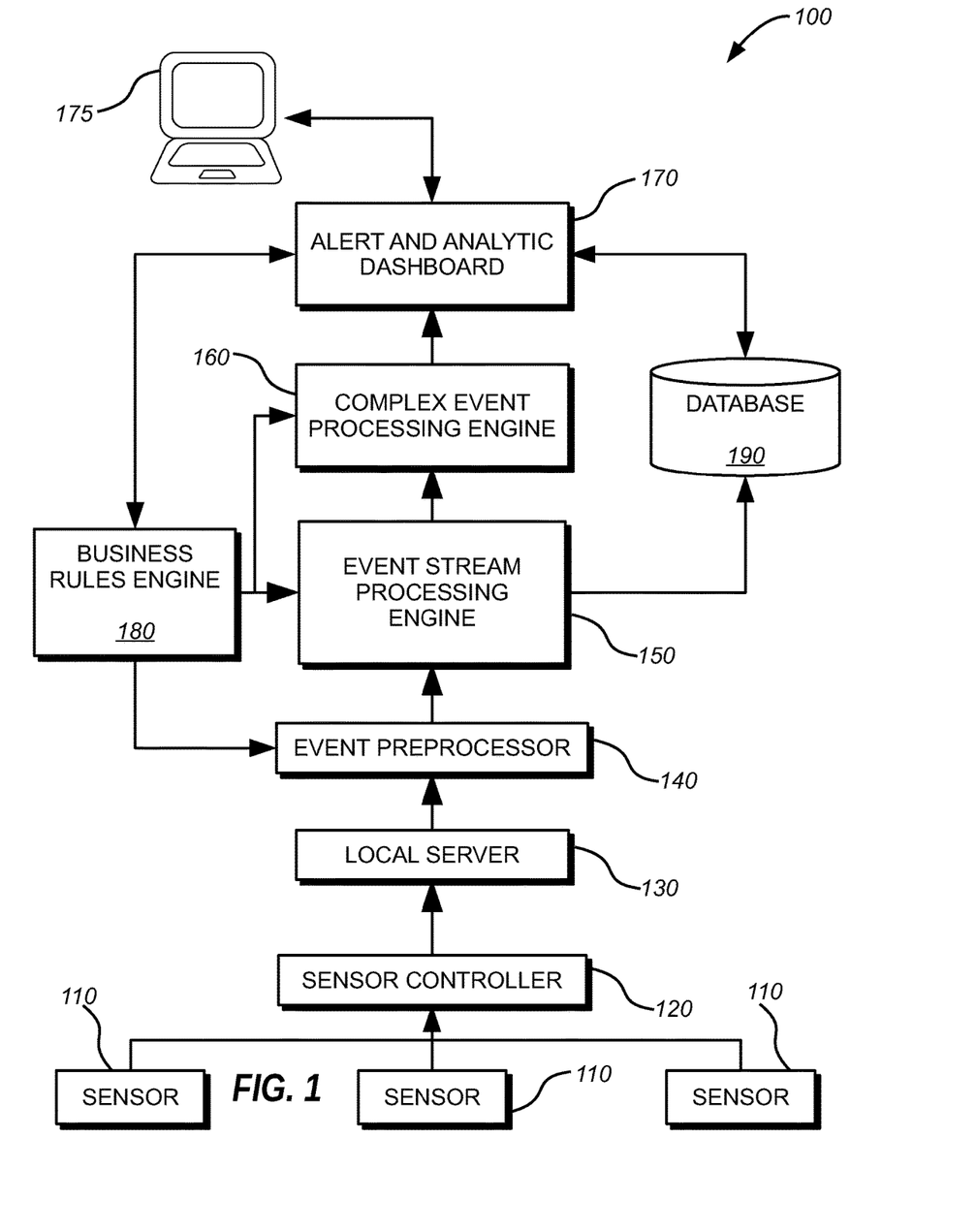
FIG. 1 is a block diagram illustrating a sensor analytics system according to one embodiment of the present disclosure.

FIG. 1 is a block diagram depicting a sensor analytics system 100 according to one embodiment of the present disclosure. In an embodiment, sensor analytics system 100 includes a plurality of sensors 110, sensor controller unit 120, local server 130, event preprocessor 140, event stream processing engine 150, complex event processing engine 160, alert and analytic dashboard 170, business rules engine 180, and database 190. According to various embodiments, the foregoing components and/or modules may be embodied as computer-readable instructions stored on various types of media.

Any combination of one or more computer-usable or computer-readable media may be utilized in various embodiments of the present disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CD-ROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

In one embodiment of the present disclosure, sensors 110 comprise numerous distributed sensors adapted to detect specific conditions and transmit a signal to sensor controller unit 120 regarding the current detected condition. In embodiments, sensors 110 include a variety of types of sensors including, but not limited to temperature sensors, pressure sensors, humidity sensors, and electricity meters. In embodiments, temperature sensors include both ambient (outdoor) temperature sensors, indoor ambient temperature sensors, and sensors placed within a refrigeration or freezer unit. In embodiments, electricity meters include meters adapted to measure an electric current amount, an electric voltage amount, an electric power (wattage) amount, and/or an electric energy amount. Electricity meters may measure electricity usage for a group of buildings, a building, a group of appliances, or a single appliance.

In embodiments, sensors 110 are adapted to transmit data regarding measured conditions at regular intervals, such as once per minute. In one embodiment, data is transmitted every five minutes. In other embodiments, sensors 110 are adapted to transmit data as changes in measured conditions are detected.

In one embodiment of the present disclosure, sensor controller unit 120 is placed in a location proximate to sensors 110 to which sensor controller unit 120 is in communication. Sensor controller unit 120 is adapted to receive signals from sensors 110 regarding the physical conditions monitored by each sensor 110. Communication between sensors 110 and sensor controller unit 120 may be carried out via wired or wireless communication protocols or combinations thereof. In embodiments, system 100 comprises multiple sensor controller units 120, where each sensor controller unit 120 is configured to receive signals from one particular type and/or model of sensor 110. For example, one retail location may have a sensor controller unit for receiving temperature data from multiple temperature sensors in refrigerators, while another sensor controller unit at the retail location receives pressure data from one or more pressure transducers within or near the retail location, while yet another sensor controller unit at the retail location receives electricity usage data from electricity meters at the retail location. In one embodiment, sensors of a particular type are separated into two or more groups, where sensors in each group transmit sensor data to a sensor controller unit assigned to that group.

Sensor controller units 120 are adapted to receive and aggregate sensor data and transmit the data to local server 130. In one embodiment, sensor controller units 120 transmit requests to sensors 110 on a regular basis or as previous data becomes stale. Sensor controller units 120 can poll sensors 110 for new sensor data at time intervals that are determined based on the criticality of the type of data or in response to previous out-of-threshold data received from that sensor. In another embodiment, sensor controller units 120 passively receive sensor data as said data is transmitted by the sensors 110 associated with each sensor controller unit 120.

In embodiments, sensor controller units 120 record data regarding one or more appliances with which sensors 110 and/or sensor data are associated. Sensor data may identify one or more such appliances. A sensor 110 may be associated with only one appliance or may be associated with multiple appliances. In one example, a temperature measures an internal refrigerator temperature and is associated only with that refrigerator appliance. In another example, an ambient temperature sensor is associated with multiple refrigerator and other appliances in the vicinity. In another example, an electricity meter is associated with an aisle of refrigerators that draw electric current on the same circuit.

In embodiments, multiple sensors 110 may be associated with an appliance. For example, a refrigerator appliance may be associated with an internal temperature sensor, an ambient indoor temperature sensor, an ambient external temperature sensor, an electric meter, and additional sensors collecting sensor data relevant to the operation and/or efficiency of the refrigerator appliance.

According to various embodiments, local server 130 is adapted to receive sensor data from multiple sensor controller units 120 at a location. In one embodiment, sensor data for multiple sensors 110 of a single type are aggregated at sensor controller units 120, while sensor data for multiple sensors 110 of multiple types are aggregated at local server 130 from sensor controller units. In one embodiment, sensor data is normalized at local server 130.

According to various embodiments, event preprocessor 140 is adapted to receive sensor data from one or more local servers 130 at multiple locations and aggregate and/or normalize the received data. In one embodiment, event preprocessor 140 can receive and process sensor data in real time as data events are received from local servers 130 and can transmit streaming events to event stream processing engine 150. According to various embodiments, event preprocessor 140 is programmed to process sensor data by filtering and/or carrying out aggregations of the received data. In one embodiment, event preprocessor 140 is programmed to carry out mathematical functions such as counting, averaging, and/or other various statistical analyses among the specific type of sensor data events. In embodiments, event preprocessor 140 can retrieve a business rule from event stream processing engine 150 for evaluation. Said evaluation by event preprocessor 140 may include comparing sensor data to alarm conditions and generating an alarm event based on a deviation from existing values set in a business rule.

In one embodiment, event stream processing engine 150 is adapted to receive streaming events from event preprocessor 140, analyze the sensor event data to detect patterns, compare the received sensor event data to predetermined thresholds and/or patterns, and generate alarm events if any alarm conditions, thresholds, and/or patterns are detected in the sensor data. In one embodiment, thresholds can be configured dynamically based on other factors. A dynamic threshold may be reconfigured in response to other sensor data or other factors such as the time of day, the day of the week, the season, holidays, nearby special events, weather events, or other observed data trends. Alarm events can be transmitted to a response group to address potential causes of the alarm event, including repairing or replacing the sensor(s) and/or appliance(s) associated with the alarm event. One embodiment of event stream processing engine 150 is configured to receive alarm conditions, alarm thresholds, and/or alarm patterns from business rules engine 180 for comparison to data sensor event streams. Dynamic thresholds may be embodied in a business rule. In an embodiment, event stream processing engine 150 can receive dynamic threshold values that are tailored for the current situation and compare incoming streaming sensor data to the dynamic thresholds to determine if an alarm event should be generated. In embodiments, event stream processing engine 150 can transmit sensor data to complex event processing engine 160 for further analysis, correlation of various sensor data events, and generation of data insight. In embodiments, event stream processing engine 150 can transmit sensor data to database 190.

In one embodiment, complex event processing engine 160 is adapted to analyze the sensor data event streams to find correlations between sensor data events within a timeframe and generate insight events based on the analysis. In embodiments, complex event processing engine 160 can receive event streams from event stream processing engine 150 and historical sensor from database 190.

In one embodiment, alert and analytic dashboard 170 comprises a user interface through which alerts can be transmitted, alarm prioritizations can be set, data modelling can be carried out, repair requests can be generated, and other management functions of system 100 can be executed. One or more users 175 can access various management functions via the user interface of alert and analytic dashboard 170.

Figure 2:
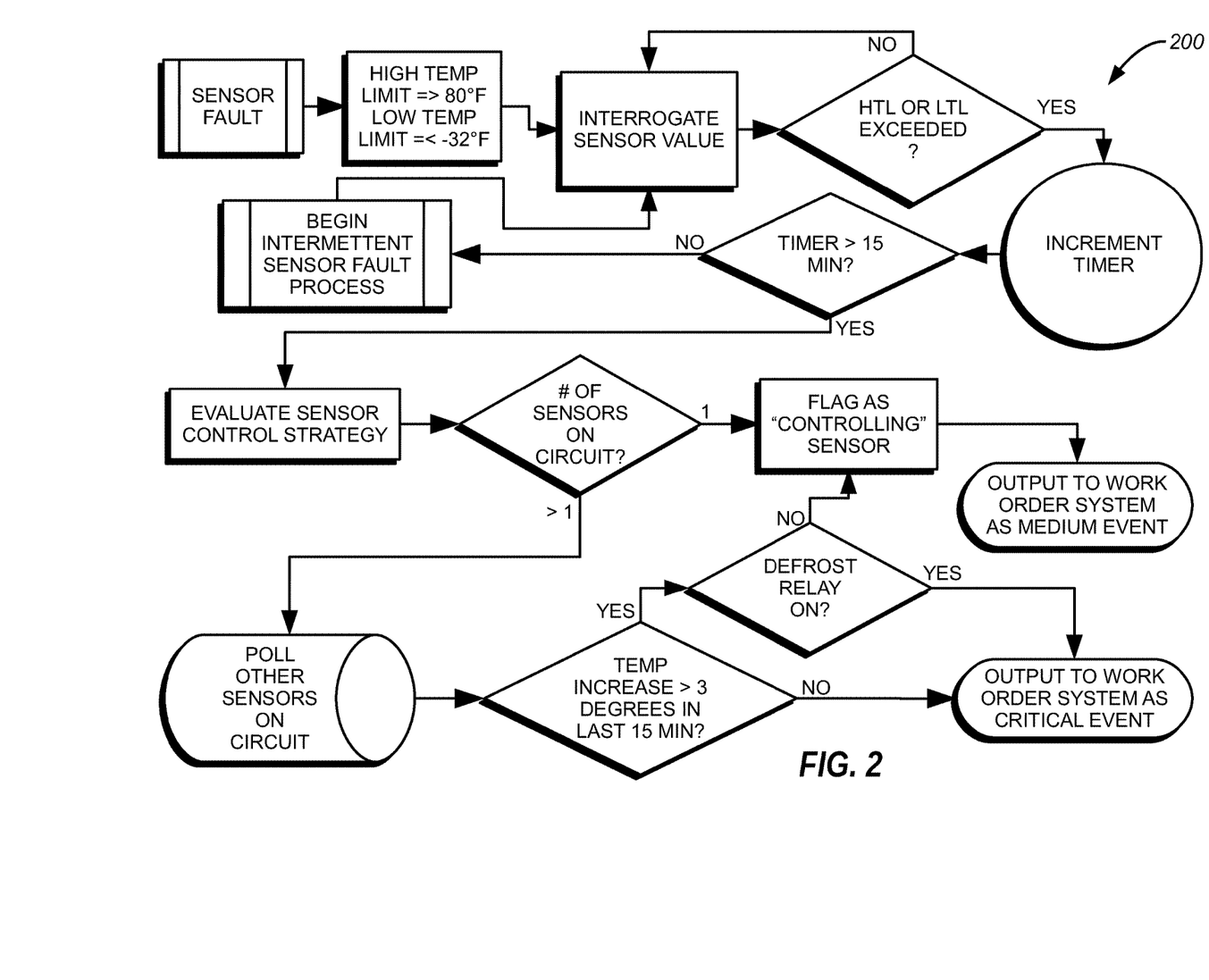
FIG. 2 is a flow chart diagram illustrating an example business rule according to one embodiment of the present disclosure.

Embodiments of business rules engine 180 are adapted to receive business rules and/or priorities from alert and analytic dashboard 170. Business rules engine 180 is further adapted to enforce said rules by interacting with event stream processing engine 150 so that event preprocessor 140 and/or event stream processing engine 150 can be programmed to respond appropriately to updated business rules and alarm conditions. According to various embodiments, business rules may include one or more alarm conditions and various evaluation steps to arrive at one or more specific decisions. In embodiments, multiple business rules may be applied for a specific type of event. Referring to FIG. 2, an illustrative business rule 200 is depicted as a flow chart. It is to be understood that the business rule depicted is only an example and not to be interpreted in a limiting sense.

In one embodiment, database 190 comprises multiple distributed, redundant storage devices. Database 190 can store sensor data, metadata regarding the sensor data, and other data related to alarm conditions, insights and correlations regarding sensor data, and the like.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment or portion of code, which comprises one or more executable instructions for implementing the specified logical function(s). It is noted that each block and/or multiple blocks in the flowcharts or block diagrams may represent one or more physical systems, such as one or more server systems, a collection of systems (e.g., bladed server systems), a cluster of systems, mainframe computer system, or any type and configuration of systems. Such systems may also include virtualized resources such as virtual server systems, and may include one or more levels of virtualization. In embodiments, such module(s) and/or segment(s) or portion(s) of code may be implemented across sites to provide redundancy in the case of site or system failure. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 3:
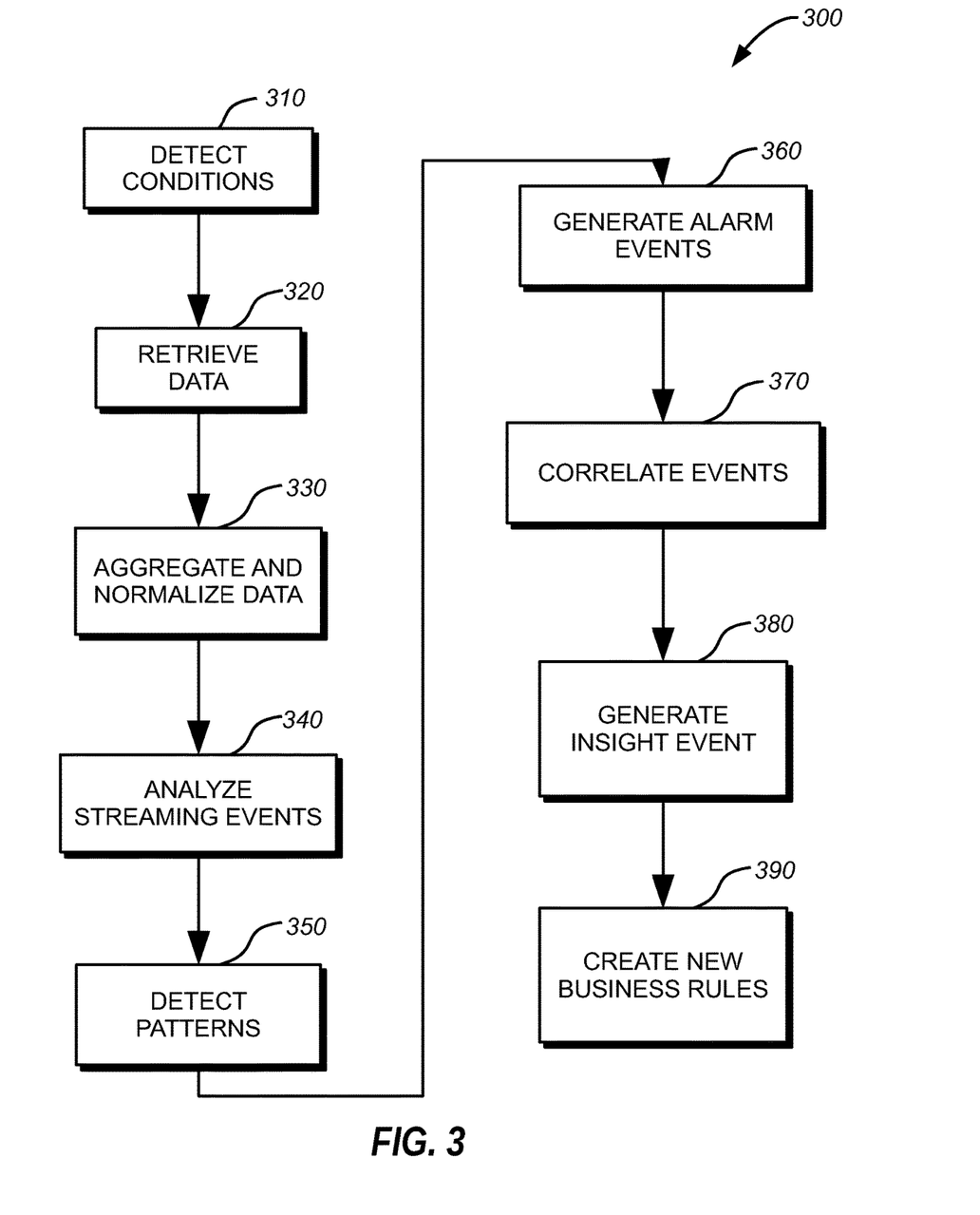
FIG. 3 is a diagram illustrating a method for monitoring sensor data according to one embodiment of the present disclosure.

In operation, embodiments of the present disclosure are configured to monitor sensor data, collect the sensor data, analyze the sensor data, and conduct real-time responses to specific conditions observed in the sensor data. Referring to FIG. 3, an illustration of a method 300 for monitoring sensor data is set forth according to one embodiment of the present disclosure.

Method 300 begins at operation 310, where one or more sensors collect data representing current conditions at one or more locations. The sensor data may be tagged with metadata for the type of sensor and the type(s) of appliance(s) with which each sensor is associated. In embodiments, the sensor data may be tagged with metadata identifying the particular sensor and/or associated appliance(s).

At operation 320, sensor controllers retrieve the sensor data. In one embodiment, sensor data is collected from multiple sensors at the location where each sensor controller operates. Each sensor controller may communicate and/or receive sensor data from a set of sensors Metadata can also be received by each sensor controller.

At operation 330, sensor data and associated metadata is collected and aggregated by a local server and then an event preprocessor. In embodiments, the event preprocessor can normalize the data collected from numerous sensors, sensor controllers, and/or local servers. In one embodiment, the sensor data stream may be analyzed as events. In the present disclosure, an event may include a discrete data point representing a single sensor reading or multiple related data points. An event may further include metadata describing the sensor, a related appliance, or other related information.

An event may comprise a series of multiple consecutive sensor readings from a single sensor or from multiple sensors.

At operation 340, the event stream processing engine receives and analyzes the streaming events. At operation 350, the event stream processing engine looks for particular patterns of data. As will be set forth in further detail, some patterns may be identified to signify specific real-world conditions that are of particular interest and that may call for a particular response.

At operation 360, the event stream processing engine generates alarm events for each event that meets alarm conditions. An alarm event can include details about the underlying cause of the alarm event such as an inoperative or inefficient appliance. An alarm event can include information to identify corrective action. In embodiments, an alarm condition is a communication that is transmitted to a repair agent to carry out correction of the underlying cause of the alarm condition.

At operation 370, the complex event processing engine searches through current and past events for correlations between various appliances, sensors, and external conditions. Complex event processing engine can retrieve data from the database regarding historical sensor data to search for correlations. Correlations may be made amongst sets of appliances, sequences of events involving one or more appliances, events that involve broad groups of appliances, and various combinations thereof. Such correlations may be analyzed to determine way to increase efficiencies, decrease product loss, and otherwise optimize use of appliances.

At operation 380, the complex event processing engine generates insights based on correlation of events determined at operation 370. At operation 390, new business rules are created according to findings at operations 370 and 380. Business rules may prioritize operation of particular appliances and may determine how alarms are generated for future sensor event streams. A user may make selections according to business priorities at the alert and analytic dashboard to tailor the business rules to the particular values of the business operating the system.

In embodiments, in-store refrigeration alarms can be prioritized by temperature and/or the difference between detected temperature and a threshold temperature for the refrigerator appliance. Further, alarm events may be distinguished and prioritized by the type of product in the refrigeration unit. For example, a refrigerator holding floral products may be given a lower priority compared to a refrigerator holding meat products. An alarm that is a high priority can be generated as a critical alarm, which can then be prioritized for faster response. Embodiments of the present disclosure can provide alarm events for identification, analysis, and decision making to resolve problem issues within an acceptable timeframe.

According to some embodiments, alarm conditions may include high and/or low thresholds for individual sensor. The threshold for each sensor may be set according to the particular application of that sensor. For example, a temperature sensor in a freezer unit may have a lower temperature threshold than a sensor in a refrigerator unit.

In one embodiment, an alarm event can be created upon detection that a sensor has failed or is malfunctioning. Sensor data can be compared over time and/or across multiple sensors in the same circuit to detect anomalies that indicate a failed and/or malfunctioning sensor. In some embodiments, such an anomaly comprises loss of communication from a sensor and/or sensor controller. A sensor and/or sensor controller may be pinged to monitor the sensor's condition. If there is no response, an alarm event may be generated to repair the sensor and/or sensor controller. In one embodiment, one type of anomaly is stale data. Stale data may be detected by observing unchanging data patterns over time from a sensor.

According to various embodiments, as sensor data from multiple related sensors are analyzed, an alarm event may be generated by observing out-of-threshold data values from the multiple sensors. For example, if multiple temperature sensors in an aisle of refrigerator units show unexpected increases in temperatures, the alarm event may indicate that an electrical circuit powering the entire aisle has failed.

In embodiments, complex event processing engine 160 is programmed to detect expected patterns in sensor data over time rather than merely relying on strict thresholds for alarm events. For example, a defrost cycle may be carried out by freezer units on a periodic basis. A defrost cycle may result in a fairly typical temperature profile as the freezer unit temperature rises for a short time before descending back to the normal operating temperature of the freezer. If a temperature profile is detected by a sensor in a freezer unit that is similar to the known defrost temperature profile, it may be determined that no alarm event should be generated, as a defrost cycle is a normal aspect of freezer operation and there is no appliance malfunction. In some cases, a malfunctioning and/or defective freezer unit may exhibit a degradation in its defrost cycle, such as faster and/or slower changes in temperature compared to the expected defrost temperature profile. Detection of degradation of the defrost cycle may indicate a problem with the appliance unit. In one embodiment, an alarm event is generated so that corrective action may be taken.

In one embodiment, complex event processing engine 160 is programmed to carry out predictive analyses on sensor data based on historical sensor data and known characteristics of the particular appliances. For example, predictive event management includes estimating a run time to failure for a particular appliance. Such an estimate may be made based on multiple types of sensor data associated with that appliance.

According to embodiments, sensor data can be analyzed in conjunction with weather data to find correlations and make insights. In one embodiment, complex event processing engine 160 can analyze correlations between various event streams to recognize parent-child relationships. In the present disclosure, a "parent-child" relationship may identify causations amongst physical conditions external or internal to appliances. A parent-child relationship may be indicated by corroborating signals. For example, when a certain number of sensors fail, there may be a larger problem than a simple malfunction of each individual appliance. By identifying the root of a problem, corrective action may be carried out relatively quickly.

In embodiments, complex event processing engine 160 can carry out rule modeling based on historical sensor data. In one embodiment, a user can create a new rule and model behavior of the new rule over existing data to see the results For example, a rule that accounts for seasonality can be modeled to determine what would have occurred if a certain alarm condition were set at three degrees higher than it was. Complex event processing engine 160 can simulate what the output would have been under the proposed alarm condition and determine how many more or less alarm events would have occurred over the past sensor data.

In various embodiments, appliances may include, but are not limited to refrigerators, freezers, trash compactors, lighting, HVAC systems, and electrical circuits. Sensors may include, but are not limited to temperature sensors, pressure sensors, weather (i.e. rain and/or wind) sensors, light sensors, appliance door sensors, and energy meters.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for monitoring sensor data comprising:
    receiving, from a plurality of sensors, sensor data, each of the plurality of sensors being associated with an appliance unit having an appliance type, wherein the appliance unit comprises a refrigerator and the sensor data comprises a temperature reading;
    converting, at an event preprocessor, the sensor data to normalized data, wherein the normalized data includes metadata identifying the appliance unit and the appliance type;
    aggregating, at a centralized database, the normalized data;
    comparing, at an event stream processing engine, the normalized data to at least one dynamic alarm threshold to identify an alarm event;
    issuing a notification to correct the appliance or sensor unit based on the alarm event;
    dynamically adjusting, at a complex event processing engine, the at least one dynamic alarm threshold based on at least one developed business rule for subsequent normalized data by tailoring the at least one dynamic alarm threshold from a first alarm threshold value to a second alarm threshold value, the first alarm threshold value being different from the second alarm threshold value; and
    dynamically adjusting, at a business rules engine, the at least one developed business rule based on the at least one dynamic alarm threshold and the alarm event for the subsequent normalized data by tailoring the at least one developed business rule from a first business rule to a second business rule, the first business rule being different from the second business rule.

2. The method of claim 1, wherein the sensor data comprises an external temperature reading.

3. The method of claim 1, wherein the criterion for the alarm event comprises a dynamic temperature threshold.

4. The method of claim 1, further comprising: selecting a priority level for the alarm event; associating a priority criterion with the priority level; analyzing the normalized data to identify that the priority criterion is satisfied; and issuing a priority alert to correct the appliance unit based on the alarm event.

5. The method of claim 1, wherein analyzing the normalized data comprises analyzing a data trend over time for the appliance unit.

6. The method of claim 1, wherein analyzing the normalized data comprises identifying a correlation between multiple alarm events in the data associated with the appliance unit.

7. The method of claim 1, wherein analyzing the normalized data comprises identifying a pattern in sensor data associated with a plurality of appliance units.

8. The method of claim 1, further comprising: formulating a new alarm event and modeling behavior for the new alarm event over previously captured data.

9. The method of claim 1, wherein the sensor comprises an electricity meter.

10. The method of claim 1, wherein the sensor comprises a pressure sensor.

11. A system for monitoring sensor data, comprising:
    one or more appliance units, each appliance unit having an appliance type, wherein at least one of the one or more appliance units comprises a refrigerator;
    one or more sensors, each sensor being associated with at least one of the appliance units; and
    one or more processors and one or more memory devices operably coupled to the one or more processors, the one or more memory devices storing executable and operational code effective to cause the one or more processors to:
        receive, from the one or more sensors, sensor data, wherein the sensor data comprises a temperature reading;
        convert the sensor data to normalized data, wherein the normalized data includes metadata identifying at least one of the one or more appliance units and the appliance type;
        aggregate the normalized data;
        compare the normalized data to at least one dynamic alarm threshold to identify an alarm event,
        issue a notification to correct the appliance unit or sensor based on the alarm event;
        dynamically adjust the at least one dynamic alarm threshold based on at least one developed business rule for subsequent normalized data by tailoring the at least one dynamic alarm threshold from a first alarm threshold value to a second alarm threshold value, the first alarm threshold value being different from the second alarm threshold value; and
        dynamically adjust the at least one developed business rule based on at least one dynamic alarm threshold and the alarm event for the subsequent normalized data by tailoring the at least one developed business rule from a first business rule to a second business rule, the first business rule being different from the second business rule.

12. The system of claim 11, wherein the criterion for the alarm event comprises a dynamic temperature threshold.

13. The system of claim 11, wherein the memory devices stores executable and operational code further effective to cause the one or more processors to: select a priority level for the alarm event; associate a priority criterion with the priority level; analyze the normalized data to identify that the priority criterion is satisfied; and issue a priority alert to correct the appliance unit based on the alarm event.

14. The system of claim 11, wherein the memory devices stores executable and operational code further effective to cause the one or more processors to identify a correlation between multiple alarm events in the data associated with the appliance unit.

15. The system of claim 11, wherein the memory devices stores executable and operational code further effective to cause the one or more processors to identify a pattern in sensor data associated with a plurality of appliance units.

16. The system of claim 11, wherein at least one of the one or more sensors comprises an electricity meter.

* * * * *